United States Patent
Lee

(10) Patent No.: US 7,506,733 B1
(45) Date of Patent: Mar. 24, 2009

(54) BALL-IN-RAMP BRAKE CALIPER TYPE PARKING BRAKE FOR VEHICLE

(75) Inventor: Kangkuk Lee, Gyeongbuk (KR)

(73) Assignee: Hyundai Mobis Co., Ltd., Seoul (KR)

( * ) Notice: Subject to any disclaimer, the term of this patent is extended or adjusted under 35 U.S.C. 154(b) by 2 days.

(21) Appl. No.: 11/933,574

(22) Filed: Nov. 1, 2007

(30) Foreign Application Priority Data

Aug. 31, 2007 (KR) .................... 10-2007-0088062

(51) Int. Cl.
*F16D 65/16* (2006.01)
(52) U.S. Cl. .................................... 188/72.7
(58) Field of Classification Search ....... 188/71.6–72.9; 192/84.6, 84.7, 84.93, 93 A
See application file for complete search history.

(56) References Cited

U.S. PATENT DOCUMENTS

| | | | | | |
|---|---|---|---|---|---|
| 3,952,843 | A | * | 4/1976 | Campbell et al. | 188/71.4 |
| 5,038,895 | A | * | 8/1991 | Evans | 188/72.7 |
| 5,060,765 | A | * | 10/1991 | Meyer | 188/71.9 |
| 5,263,554 | A | * | 11/1993 | Mery | 188/72.7 |
| 5,322,146 | A | * | 6/1994 | Holl et al. | 188/71.2 |
| 5,487,452 | A | * | 1/1996 | Moinard et al. | 188/72.7 |
| 5,529,150 | A |   | 6/1996 | Buckley et al. | |
| 5,609,227 | A | * | 3/1997 | Mery | 188/72.7 |
| 5,788,024 | A | * | 8/1998 | Meyer | 188/72.7 |
| 6,082,504 | A | * | 7/2000 | Organek et al. | 188/72.7 |
| 6,460,677 | B1 | * | 10/2002 | Roscoe | 192/84.7 |
| 6,860,570 | B2 | * | 3/2005 | Yanaka et al. | 303/20 |
| 2005/0205376 | A1 | * | 9/2005 | Kemper | 192/48.2 |
| 2005/0217949 | A1 |   | 10/2005 | Ohta | |
| 2007/0296269 | A1 |   | 12/2007 | Jeon | |

FOREIGN PATENT DOCUMENTS

JP        2005 299926        10/2005

OTHER PUBLICATIONS

English language Abstract of JP 2005-299926.
U.S. Appl. No. 11/933,567 to Lee et al., filed Nov. 1, 2007.

* cited by examiner

*Primary Examiner*—Christopher P Schwartz
(74) *Attorney, Agent, or Firm*—Greenblum & Bernstein, P.L.C.

(57) ABSTRACT

In a BIR type brake caliper according to the embodiment of the present invention, when a BIR (Ball in Ramp) type cartridge assembly, which generates an axial force while rotating, presses pads against a disk plate during parking braking, balls provided between input and output ramps of the cartridge assembly move along variable trajectories gradually decreased in a radial direction and increase a force. For this reason, even though an operation force of a parking lever is small, the cartridge assembly generates a force capable of maintaining a parking braking force. As a result, it is possible to obtain characteristic reducing an operation force, which should be applied to a parking handle by a driver.

8 Claims, 3 Drawing Sheets

(A)

(B)

BALL-IN-RAMP BRAKE CALIPER TYPE PARKING BRAKE FOR VEHICLE

CROSS-REFERENCE TO RELATED APPLICATIONS

The present application is based on, and claims priority from, Korean Application Serial Number 10-2007-0088062, filed on Aug. 31, 2007, the disclosure of which is hereby incorporated by reference herein in its entirety.

FIELD OF THE INVENTION

The present invention relates to a parking brake for a vehicle, and more particularly, to a Ball-In-Ramp brake caliper type parking brake for a vehicle.

BACKGROUND OF THE INVENTION

In general, a parking brake, which is used to temporarily park a vehicle or park a vehicle on an inclined place such as a hill, applies pressure to a wheel by using cables pulled by a hand unlike a brake that applies pressure to a wheel by using oil pressure generated by a general pedal. The parking brake is operated by a parking lever provided near a driver's seat.

The parking brake includes a parking lever, a parking brake cable, and an equalizer. The parking lever is operated by a hand. The parking brake cables are pulled or loosened by a latch assembly (not shown) operated by a release knob, which is provided in the lever and releases the brake. The equalizer is provided between left and right cables connected to left and right rear wheels, and uniformly distributes an operation force.

The above-mentioned parking brake is generally locked by a strong contact force generated by pressing pads against a drum, which is provided in the wheel, with an operation force of the parking brake.

Further, a manner using a caliper for performing braking with a disk plate positioned between pads is also used instead of a manner pressing the pads against the drum. The caliper, which forms the parking brake and applies a braking force to the disk plate, is generally called a BIR caliper (Ball-In-Ramp Caliper).

As a parking brake using the BIR caliper is operated, an axial force is generated in the BIR caliper by a parking cable. That is, when a pulling force of the parking cable is changed into torque of a ramp and the positions of balls provided in the BIR caliper are changed, an increased axial force is generated at an opposite ramp due to the movement of the balls and pads are pressed against the disk plate due to the axial force. As a result, a parking braking force is generated.

However, the BIR caliper generates a parking braking force by using the ramp that generates an axial force along a movement trajectory of the ball according to the rotation of the ramp to which a parking braking is input. Accordingly, the BIR caliper should generate a parking braking force that is smaller than a braking force used to brake a driving car but is enough to restrict to the movement of the vehicle. For this reason, during parking braking, large initial input is needed to operate the BIR caliper.

A driver's operation unit, that is, a parking lever should be operated to have a large angle to increase the initial input used to operate the BIR caliper during parking braking. For this reason, there is a problem in that a driver's operation force is increased to perform parking braking.

SUMMARY OF THE INVENTION

Embodiments of the present invention provide a parking brake capable of reducing a driver's operation force. In the parking brake, an axial force of a BIR (Ball-In-Ramp) type cartridge assembly inserted into a caliper, which provides a liquid pressure chamber filled with brake oil, is increased due to variable movement trajectories of ball provided between the ramps. Accordingly, during braking parking, even though an operation force of a lever is small, a large parking braking force is generated by the cartridge assembly.

Further, embodiments of the present invention provide a parking brake that reduces a driver's operation force and increases a parking braking force during braking without changing the design and entire structure thereof. In the parking brake, a BIR type cartridge assembly is structured so that balls between Ramps, which move in an axial direction by a parking operation force, have variable movement trajectories.

Furthermore, embodiments of the present invention provide a parking brake where the structures of ramps and balls of a cartridge assembly are hardly changed. In the parking brake, movement trajectories of the balls of a BIR type cartridge assembly are gradually decreased in a radial direction in the ramps, in which the balls are received, and an axial force is increased.

A Ball-In-Ramp brake caliper type parking brake for a vehicle according to an embodiment of the present invention includes a parking unit, a caliper housing, a cartridge assembly, and a pad wear compensator. When a parking lever is operated, the parking unit generates an operation force to uniformly pull a parking cable by an equalizer. The caliper housing includes an inner liquid pressure chamber and pads. The inner liquid pressure chamber is filled with brake oil generating liquid pressure, and the pads are provided to cover both surfaces of a disk plate provided in a wheel. The cartridge assembly protrudes to the outside of the caliper housing so as to be connected to a parking operation force input unit connected to the parking cable. The cartridge assembly is provided in the liquid pressure chamber, and includes ball movement grooves having variable paths so that an axial force is gradually increased as movement trajectories of balls are gradually decreased in a radial direction so as to be shortened with respect to an axis, when the cartridge assembly is rotated. The balls move from central portions of the movement trajectories to end portions of the movement trajectories. The pad wear compensator is assembled to the cartridge assembly in the liquid pressure chamber of the caliper housing. When the cartridge assembly moves in an axial direction, the pad wear compensator presses the pads against both surfaces of the disk plate.

The cartridge assembly may include an input ramp, an output ramp, and a ball case housing. The input ramp is rotated by the parking operation force input unit of which one end is connected to the parking cable outside the caliper housing. The output ramp is provided at a side opposite to the input ramp, and generates an axial force pushing the pads toward the disk plate when the input ramp is rotated. The ball case housing is provided in the ball movement grooves having the variable paths formed on the input and output ramps, and gradually increases the axial force of the output ramp as balls having movement trajectories along the ball movement grooves move from the central portions to the ends portions during the rotation of the input ramp.

The cartridge assembly may further include a spring and a holder housing. If the output ramp that has moved in the axial direction returns to the initial position while a parking state is released, the spring generates an elastic force to push the output ramp to an initial position. The holder housing is provided on the output ramp so as to surround the spring, and is fixed to a spring seat of the input ramp.

The input ramp may include a rod, a ball movement plate, and ball movement grooves. The rod has a shape of a long shaft so as to protrude to the outside of the caliper housing. The ball movement plate is formed at an end of the rod received in the liquid pressure chamber of the caliper housing, and has a large diameter and the same axis as the rod. The ball movement grooves are formed on one surface of the ball movement plate at constant intervals, and each have a shape of a channel having a predetermined dimension.

A depth of each of the ball movement grooves may be gradually decreased from the central portion of the ball movement groove toward both end portions of the ball movement groove with respect to an axis of each of the input and output ramps.

A central radius R1 of each of the ball movement grooves may be largest so that a radius of the ball with respect to the axis of each of the input and output ramps is decreased from the central radius R1 to an end radius R3 from the central portion of each of the ball movement grooves toward the end portions of each of the ball movement grooves. The radius R3 of the end portion of each of the ball movement grooves may be an end radius R2 of a circle having a center that is offset from the center by X and Y offset distances.

The ball case housing may be composed of a ring-shaped ball restricting plate that has a hole at the center thereof. The ball movement holes may be partially opened at the circumferences thereof and formed on the ball restricting plate at constant intervals. Each of the balls may be fitted into the ball movement hole so as to move in the radial direction. Each of the ball movement holes may have a length larger than a diameter of the ball so that the ball linearly moves in the radial direction. Each of the ball movement holes may have a ball restricting entrance, which has a diameter smaller than the diameter of the ball, at the end thereof so as to prevent the ball from being separated from the ball movement hole.

According to the embodiment of the present invention, an axial force is significantly increased using ramps and balls of a BIR (Ball-In-Ramp) type cartridge assembly inserted into a caliper, which provides a liquid pressure chamber filled with brake oil. Accordingly, during braking parking, the old, the feeble, and women also can generate an enough parking braking force with a small operation force.

Further, since the BIR type cartridge assembly according to an embodiment of the present invention increases a parking braking force by using ramps and balls, the designs of a parking brake and a cartridge assembly hardly need to be changed.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

A preferred embodiment of the present invention will be described in detail below with reference to the accompanying drawings. Since the embodiment may be modified in various ways by those skilled in the art, the present invention is not limited to the embodiment.

Figure 1:
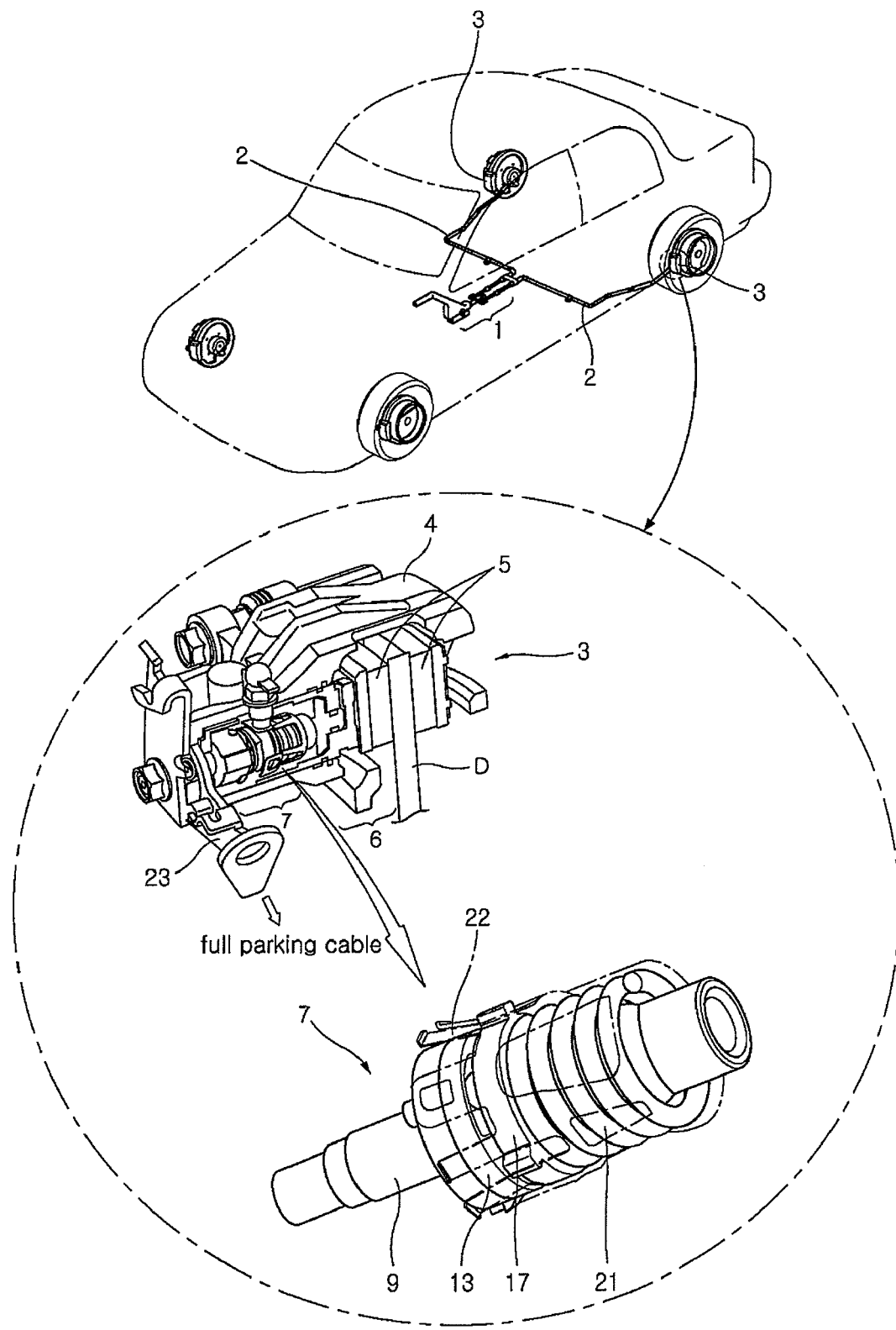
FIG. 1 is a view showing a structure of a Ball-In-Ramp brake caliper type parking brake for a vehicle according to an embodiment of the present invention.

FIG. 1 is a view showing a structure of a Ball-In-Ramp brake caliper type parking brake for a vehicle according to an embodiment of the present invention. A parking brake according to the embodiment of the present invention includes a parking unit 1 and caliper 3. Parking unit 1 is provided in a cabin of a vehicle and used to pull parking cables 2 connected to wheels. Caliper 3 generates a parking braking force using an axial force generated while being rotated due to a pulling force applied by parking unit 1, and presses pads 5 against a disk plate D so that a braking force is generated by the pressure of brake oil during braking.

Further, a parking handle of parking unit 1 that is operated by a driver is provided in a cabin of a vehicle. A parking lever is connected to caliper 3 by parking cables 2 so that caliper 3 mounted on disk plate D provided in each of the wheels is operated by a pulling force applied by the parking handle. An equalizer, which allows the operation force of the parking handle to be uniformly applied to left and right wheels, is provided on parking cables 2.

In addition, caliper 3 includes a caliper housing 4 and a pair of pads 5. The caliper housing 4 is provided to cover both surfaces of disk plate D provided in each of the wheels, and has a liquid pressure chamber, which is filled with brake oil, therein. The pair of pads 5 is provided in caliper housing 4 so as to move in a side direction of disk plate D.

In this case, caliper housing 4 has the same structure as a caliper housing of a general caliper type brake system, and is operated in the same manner as the caliper housing of the general caliper type brake system.

Further, a parking force generator is provided in the liquid pressure chamber of caliper housing 4 so as to generate an axial force pressing pads 5 against disk plate D during braking.

The parking force generator includes a BIR type cartridge assembly 7 and a pad wear compensator 6. While being rotated by a parking operation force input unit 23 that is connected to parking cable 2 outside caliper housing 4, BIR type cartridge assembly 7 moves in an axial direction. Pad wear compensator 6 presses pads 5 against disk plate D by the axial force applied by cartridge assembly 7.

One end of parking operation force input unit 23 is connected to parking cable 2. Accordingly, when parking cable 2 is pulled, an element connected to the other end of the parking operation force input unit is rotated.

In this case, the element rotated by parking operation force input unit 23 is cartridge assembly 7 protruding to the outside of caliper housing 4.

Pads 5, which move toward disk plate D, are fixed to pad wear compensator 6. The pad wear compensator pushes the pads by the pressure of oil that is supplied to the liquid pressure chamber of caliper housing 4 during braking, or pushes pads 5 by the axial force during parking braking. The pad wear compensator has a general structure of a BIR (Ball-In-Ramp) type caliper brake.

Cartridge assembly 7 has a BIR (Ball-In-Ramp) type structure that generates an axial force while rotating. When parking operation force input unit 23 is pulled by parking cable 2 and is rotated, balls 16 push an element disposed at an end of the cartridge assembly opposite to the parking operation force input unit in an axial direction while moving along variable trajectories gradually decreased in a radial direction and increasing a force. As a result, while pads 5 move toward disk plate D, a parking braking force is generated.

Figure 2:
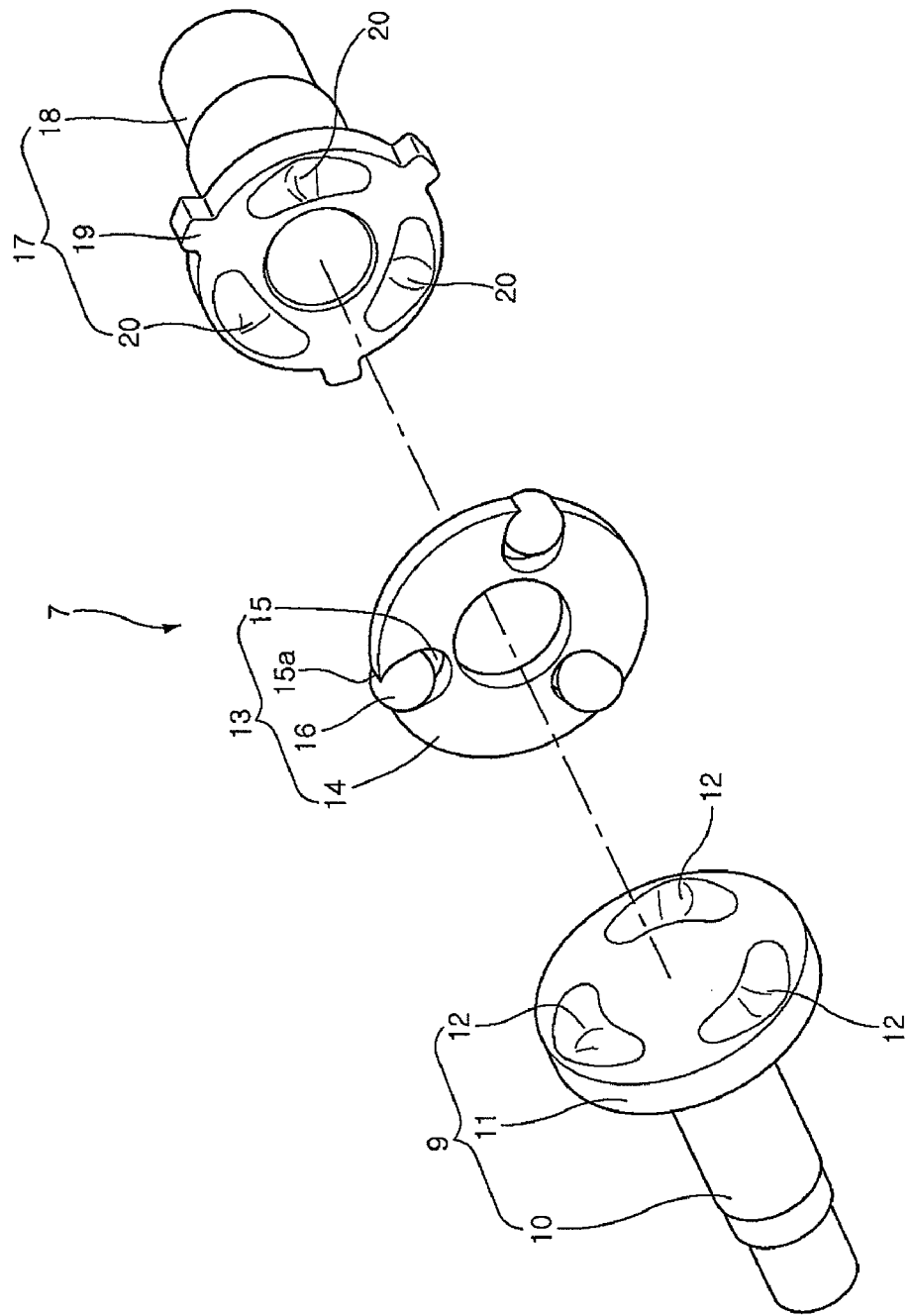
FIG. 2 is an exploded perspective view a ramp assembly, which is a braking force generator, according to the embodiment of the present invention.

For this purpose, as shown in FIG. 2, cartridge assembly 7 includes an input ramp 9, an output ramp 17, and a ball case housing 13. Input ramp 9 is rotated by parking operation force input unit 23 of which one end is connected to parking cable 2 outside caliper housing 4. Output ramp 17 is provided at a side opposite to input ramp 9, and generates an axial force pushing pads 5 toward disk plate D when input ramp 9 is rotated. Ball case housing 13 is provided between input and output ramps 9 and 17, and pushes output ramp 17 in the axial direction by the rotating input ramp 9.

In addition, cartridge assembly 7 further includes a spring 21 and a holder housing 22. If output ramp 17 that has moved in the axial direction returns to an initial position while the parking state is released, spring 21 generates an elastic force to push output ramp 17 to the initial position. Holder housing 22 is provided on output ramp 17 so as to surround spring 21, and is fixed to a spring seat of input ramp 9.

In this case, a coil spring is used as spring 21.

Further, holder housing 22 is provided with one or more hooks or locking pieces having the shape of a latch, which are caught by and fixed to the spring seat of input ramp 9. The hooks or the locking pieces are formed on the holder housing at constant intervals of 120 degrees.

Further, input ramp 9 includes a rod 10, a ball movement plate 11, and ball movement grooves 12. Rod 10 has a shape of a long shaft so as to protrude to the outside of caliper housing 4. Ball movement plate 11 is formed at an end of rod 10, which is received in the liquid pressure chamber of caliper housing 4. The ball movement plate has a large diameter and the same axis as the rod. Ball movement grooves 12 are formed on one surface of ball movement plate 11 at constant intervals, and each have a shape of a channel having a predetermined dimension.

Further, output ramp 17 includes a rod 18, a ball movement plate 19, and ball movement grooves 20. Rod 18 is received in the liquid pressure chamber of caliper housing 4, and has a shape of a long shaft so as to push pad 5 when moving in the axial direction. Ball movement plate 19 is formed at an end of rod 18, and has a large diameter and the same axis as the rod. Ball movement grooves 20 are formed on one surface of ball movement plate 19 at constant intervals, and each have a shape of a channel having a predetermined dimension.

As described above, ball movement grooves 12 formed on ball movement plate 11 of input ramp 9 are the same as ball movement grooves 20 formed on ball movement plate 19 of output ramp 17. When the input and output ramps are assembled in the liquid pressure chamber of caliper housing 4 and ball movement plate 19 of output ramp 17 comes in contact with ball movement plate 11 of input ramp 9, ball movement grooves 12 and 20 formed on ball movement plates 11 and 19 are aligned to each other.

As shown in FIG. 3A, ball movement grooves 12 and 20 are formed at three points around the centers of ball movement plates 11 and 19 to have constant intervals. Each of the ball movement grooves has a length corresponding to the rotation range of input ramp 9, which generates a parking braking force.

For this purpose, each of ball movement grooves 12 and 20 has a constant reference radius R from the axis of each of input and output ramps 9 and 17. The depth of the groove is gradually decreased from the central portion toward both end portions of the groove, and the width of the groove is also decreased from the central portion toward both end portions of the groove.

That is, each of ball movement grooves 12 and 20 is formed to have a shape of a smooth trajectory. That is, each of the ball movement grooves has reference radius R and a large depth at the central portion thereof, and has a radius smaller than the reference radius R and a small depth at each of both end portions thereof.

For this purpose, unlike the central portion of each of ball movement grooves 12 and 20 having reference radius R, each of the end portions thereof has an end radius R2 of a circle having a center that is offset from the center corresponding to reference radius R by X and Y offset distances a and b.

Accordingly, the central portion of each of ball movement grooves 12 and 20 has an arc of a circle having a central radius R1 (corresponding to a radial center of the groove at the central portion of the groove) with respect to the axis of each of input and output ramps 9 and 17. However, each of the end portions thereof, which continue from the central portion toward both sides, has an arc of a circle that has an end radius R2 (corresponding to a radial center of the groove at the end portion of the groove) and a center offset from the center corresponding to the reference radius by X and Y offset distances a and b.

A radius R3 indicates a distance between the axis of each of input and output ramps 9 and 17 and an end point of end radius R2. As the movement trajectory of a ball 16 is decreased toward the center, an axial force is further increased.

In this case, reference radius R is equal to central radius R1, but end radius R2 may be equal to or different from reference radius R depending on an offset position.

As described above, since the arcs corresponding to radial centers of the central portion and the both end portions of each of ball movement grooves 12 and 20 have different centers, a radial movement trajectory of ball 16 is changed.

That is, when input ramp 9 is rotated and ball 16 positioned at the central portion of ball movement groove 12 is moved to the end portion of the groove, ball 16 approaches the center due to the fact that end radius R2 of ball movement groove 12 is shorter than central radius R1 thereof. Due to the movement trajectory of ball 16, ball 16 can further protrude from ball movement groove 12.

In this case, each of ball movement grooves 12 and 20 has a substantially V-shaped cross section that is inclined upward from the central portion toward both end portions.

Further, as shown in FIG. 3B, ball case housing 13 is composed of a ring-shaped ball restricting plate 14 that has a hole at the center thereof. Ball movement holes 15 are partially opened at the circumferences thereof and formed on ball restricting plate 14 at constant intervals, and each of balls 16 is fitted into ball movement hole 15 so as to move in the radial direction.

In this case, each of ball movement holes 15 has a length larger than the diameter of ball 16 so that ball 16 linearly moves in the ball movement hole. However, the width of a ball restricting entrance 15a, which forms an entrance of each of the ball movement holes, is smaller than the diameter of ball 16 so as to prevent ball 16 from being separated from ball movement hole 15 during the movement of ball 16.

When the ball case housing is provided between input ramp 9 and output ramp 17, each of balls 16 is positioned close to ball restricting entrance 15a forming the end of ball movement hole 15 and closer to the outer position than the central portion of each of ball movement grooves 12 and 20 in the radial direction. Since ball 16 is positioned as described above, ball 16 moves inward in the radial direction while moving from the central portion of the groove toward the end portion of the groove.

Figure 3:
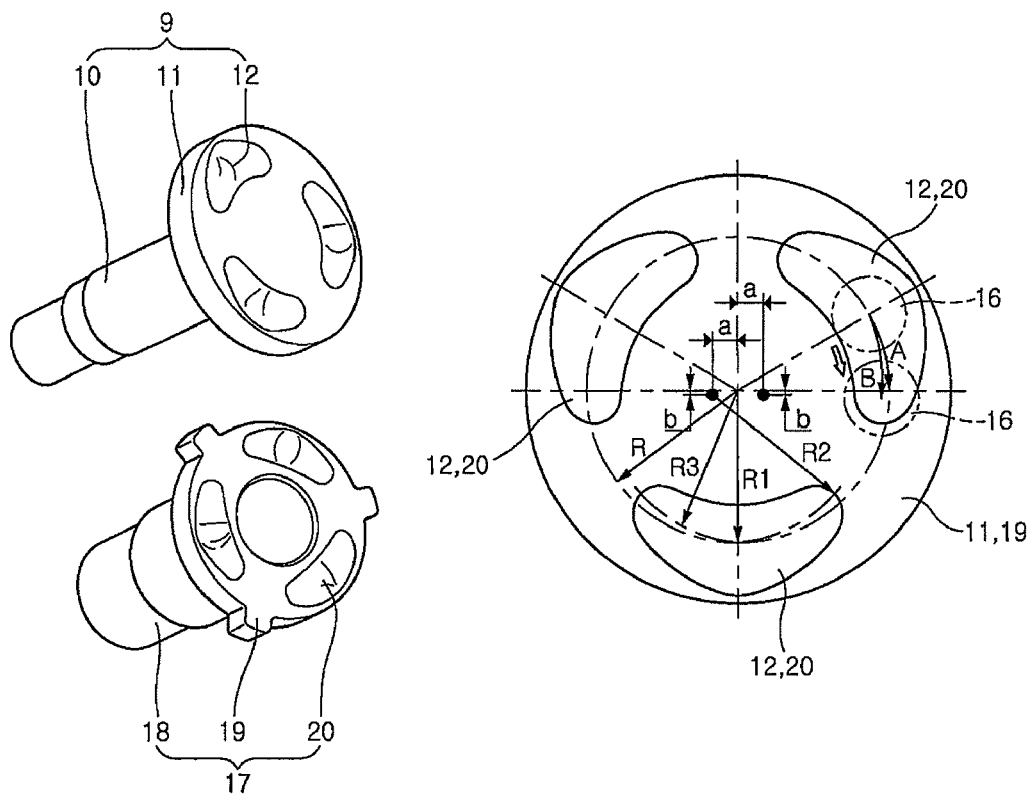
FIGS. 3A and 3B are views showing trajectories of balls of the ramp assembly according to the embodiment of present invention.
Figure 3:
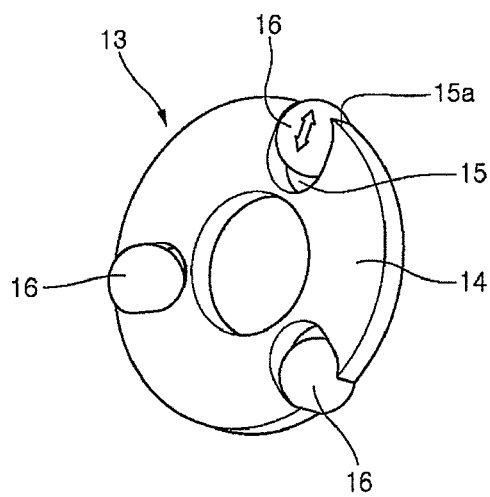

Accordingly, when ball 16 moves from the central portion of each of ball movement grooves 12 and 20 toward the end portion thereof, as shown in FIG. 3, a moving distance B of the ball along the arc corresponding to end radius R2 is larger than a moving distance A of the ball along the arc corresponding to the central radius R1.

That is, the movement trajectory of ball 16 is reduced from radius R to end radius R3 due to the movement trajectory corresponding to end radius R2 smaller than central radius R1. For this reason, balls 16 move more inward in the radial direction, and further increase the operation force of the parking lever, which is applied to parking operation force input unit 23.

Further, rod 10 of input ramp 9, which protrudes to the outside of caliper housing 4, is provided with a separate member, such as an O-ring, for the sealing, that is, for the sealing of oil filled into caliper housing 4. The sealing member has a structure for minimizing the portion of caliper housing 4 exposed to the outside, like in the general structure of a BIR (Ball-In-Ramp) type caliper brake.

The operation of the parking brake according to the embodiment of the present invention will be described in detail below with reference to the accompanying drawings.

In the BIR type brake caliper according to the embodiment of the present invention, when BIR (Ball in Ramp) type cartridge assembly 7, which generates an axial force while rotating, presses pads 5 against disk plate D during parking braking, balls 16 provided between input and output ramps 9 and 17 of cartridge assembly 7 move along variable trajectories gradually decreased in a radial direction and increase a force. For this reason, even though the operation force of the parking lever is small, cartridge assembly 7 generates a force capable of maintaining a parking braking force. As a result, it is possible to obtain characteristic reducing an operation force, which should be applied to the parking handle by a driver.

This characteristic of the embodiment of the present invention is obtained by the parking force generator that generates a parking braking force by the rotation and an axial movement in the caliper forming the parking brake. For this purpose, as shown in FIG. 1, parking operation force input unit 23, which is pulled by parking cable 2 during parking braking, is provided outside caliper housing 4. Further, cartridge assembly 7, which is connected to parking operation force input unit 23 and generates torque and an axial force, is assembled in an inner cylinder of caliper housing 4.

Furthermore, a pad wear compensator 6, which moves by the axial force generated from cartridge assembly 7, is assembled in caliper housing 4. In addition, pads 5, which are provided on both sides of disk plate D, are connected to the end of pad wear compensator 6.

Accordingly, when parking operation force input unit 23 is pulled by parking cable 2 during the operation of parking unit 1, input ramp 9 of cartridge assembly 7 connected to parking operation force input unit 23 is rotated and pushes ball case housing 13 in the axial direction. Therefore, output ramp 17 is pushed in the axial direction due to the axial force of ball case housing 13.

When output ramp 17 is pushed, spring 21 received in holder housing 12 is compressed and a force is applied to pad wear compensator 6. Since the axial force of cartridge assembly 7 is changed into the axial force of pad wear compensator 6, pad wear compensator 6 pushes pad 5.

Subsequently, pad 5, to which the axial force is applied from pad wear compensator 6, and the pad provided on the opposite side move toward disk plate D by the operation of a torque member (this is a general operation of a caliper) of caliper housing 4. Accordingly, disk plate D is caught by pads 5 and restricted, so that a parking braking force is maintained.

During parking braking, cartridge assembly 7 assembled in caliper housing 4 generates a larger axial force as compared to parking unit 1. This is caused by the structure of ball movement grooves 12 and 20 that are formed on input and output ramps 9 and 17 of cartridge assembly 7, respectively.

That is, as shown in FIG. 3A, the radial center of each of ball movement grooves 12 and 20 has reference radius R with respect to the axis of each of input and output ramps 9 and 17. The radial center of each of the both end portions of each of ball movement grooves 12 and 20 has end radius R2 of a circle having a center that is offset from the axis of each of the input and output ramps by X and Y offset distances a and b.

A radius corresponding to the central portion of each of ball movement grooves 12 and 20 is different from a radius of each of the end portions thereof by X and Y offset distances a and b. The depth of the groove is gradually decreased from the central portion toward both end portions of the groove, and reference radius R becomes an end radius R2 that is decreased toward the end portions in comparison with central radius R1.

In addition, ball case housing 13 has also a structure where balls 16 provided between input ramp 9 and output ramp 17 move in the radial direction. That is, each of ball movement holes 15, which are opened in the radial direction, is formed on ball restricting plate 14 so as to have a length larger than the diameter of ball 16. As shown in FIG. 3B, each of balls 16 fitted into the ball movement holes is not separated from ball movement hole 15 due to ball restricting entrance 15a forming the end of ball movement hole 15.

Input ramp 9 and output ramp 17 of the above-mentioned cartridge assembly 7 are disposed so that ball movement grooves 12 and 20 face each other. Each of balls 16 is positioned at the central portion, which has the largest width, of each of ball movement grooves 12 and 20.

In this case, ball 16, which is shown by a dotted line in FIG. 3A, is positioned close to ball restricting entrance 15a forming the end of ball movement hole 15 and close to the outermost position of the central portion of each of ball movement grooves 12 and 20 in the radial direction. Since ball 16 is positioned as described above, ball 16 forms not an A trajectory but a B trajectory while the radius of the trajectory of the ball is gradually decreased.

Accordingly, when parking operation force input unit 23 that is pulled by parking cable 2 during the operation of parking unit 1 rotates input ramp 9 (for example, in a counterclockwise direction), input ramp 9 is rotated. Accordingly, ball movement groove 12 is also rotated. As a result, the position of ball 16 is changed from the central position of ball movement groove 12.

That is, as ball movement groove 12 is rotated, ball 16 moves along the trajectory that corresponds to end radius R3 smaller than central radius R1 and is formed closer to the axis of the ramp. The force of the parking lever applied to parking operation force input unit 23 is larger at the trajectory corresponding to end radius R3 as compared to at the trajectory corresponding to central radius R1. Therefore, output generated in the axial direction is further increased.

When ball 16 moves along a movement trajectory, as shown in FIG. 3B, ball 16 positioned close to ball restricting entrance 15a forming the end of ball movement hole 15 moves from ball restricting entrance 15a toward the axis of the ball case housing in the radial direction thereof.

As described above, when input ramp 9 is rotated, the movement radius of the ball decreases (from central radius R1 to end radius R3). Therefore, the movement radius of the ball provided between ball movement grooves 12 and 20 having V-shaped cross sections, that is, the movement radius of ball 16 with respect to the axis of each of input and output ramps 9 and 17 also decreases from central radius R1 to end radius R2.

Since the output Fout of cartridge assembly 7 is obtained by "Fout=(Fin×L)/(R3×tan θ)", that is, the output of the cartridge assembly is in inverse proportion to the movement radius of ball 16, the decrease of the movement radius of ball 16 (from central radius R1 to end radius R2) causes the increase of the axial force of cartridge assembly 7.

Fin indicates an input of input ramp 9. L indicates a length of a lever used to rotate parking operation force input unit 23. R3 indicates a radius of a trajectory of grooves formed on input and output ramps 9 and 17. tan θ indicates an inclination of each of ball movement grooves 12 and 20, in which ball 16 is received, in the cross section. Fout indicates an axial force of output ramp 17.

Accordingly, when balls 16 move along the variable movement trajectories of the balls from the central portions of ball movement grooves 12 and 20 toward the end portions of the ball movement grooves, the torque, that is, input of input ramp 9 is further increased by balls 16, thereby increasing the output of output ramp 17 that generates an axial force.

A force, which pushes pad wear compensator 6 pressing pads 5 against disk plate D, is increased due to the operation of cartridge assembly 7. Therefore, even though parking unit 1 is operated with a smaller force, cartridge assembly 7 generates a constant parking braking force. Further, when parking unit 1 is operated with a constant force, cartridge assembly 7 generates a larger parking braking force.

Meanwhile, when parking braking is released, the brake is operated reverse to the parking braking. That is, when parking unit 1 is released and parking cable 2 is loosened, the input of cartridge assembly 7 caused by parking operation force input unit 23 is released, that is, the torque of input ramp 9 is removed. Accordingly, the cartridge assembly is moved by elastic restoring forces of spring 21 provided around output ramp 17 and a return spring provided on parking operation force input unit 23, so that pads 5 are separated from disk plate D.

When parking braking is released, the rotation of input and out ramps 9 and 17 causes balls 16, which are positioned at the end portions of ball movement grooves 12 and 20, to move toward the central portions of the ball movement grooves. As a result, each of balls 16 moves in the radial direction from the inner portion of ball movement hole 15 toward ball restricting entrance 15a.

Therefore, each of balls 16, which are provided between input ramp 9 and output ramp 17 of cartridge assembly 7, is positioned close to ball restricting entrance 15a forming the end of ball movement hole 15 and close to the outermost position of the central portion of each of ball movement grooves 12 and 20 in the radial direction. As a result, the ball is in the initial state of assembly, and a parking braking force is completely released.

What is claimed is:

1. A Ball-In-Ramp brake caliper type parking brake for a vehicle, comprising:

a parking unit that generates an operation force to uniformly pull a parking cable by an equalizer when a parking lever is operated;

a caliper housing that includes an inner liquid pressure chamber filled with brake oil generating liquid pressure, and pads provided to cover both surfaces of a disk plate provided in a wheel;

a cartridge assembly that protrudes to the outside of the caliper housing so as to be connected to a parking operation force input unit connected to the parking cable, is provided in the liquid pressure chamber, and includes ball movement grooves having variable paths so that an axial force is gradually increased as movement trajectories of balls are gradually decreased in a radial direction so as to be shortened with respect to an axis, when the cartridge assembly is rotated, balls moving from central portions of the movement trajectories to end portions of the movement trajectories; and a pad wear compensator that is assembled to the cartridge assembly in the liquid pressure chamber of the caliper housing, and presses the pads against both surfaces of the disk plate when the cartridge assembly moves in an axial direction, wherein the cartridge assembly includes:

an input ramp that is rotated by the parking operation force input unit of which one end is connected to the parking cable outside the caliper housing;

an output ramp that is provided at a side opposite to the input ramp, and generates an axial force pushing the pads toward the disk plate when the input ramp is rotated; and a ball case housing that is provided in the ball movement grooves having the variable paths formed on the input and output ramps, and gradually increases the axial force of the output ramp as balls having movement trajectories along the ball movement grooves move from the central portions to the ends portions during the rotation of the input ramp, wherein the ball case housing is composed of a ring-shaped ball restricting plate that has a hole at the center thereof, ball movement holes are partially opened at the circumferences thereof and formed on the ball restricting plate at constant intervals, and each of the balls is fitted into the ball movement hole so as to move in the radial direction; and each of the ball movement holes has a length larger than a diameter of the ball so that the ball linearly moves in the radial direction, and has a ball restricting entrance, which has a diameter smaller than the diameter of the ball, at the end thereof so as to prevent the ball from being separated from the ball movement hole.

2. The parking brake as defined in claim 1, wherein a depth of each of the ball movement grooves is gradually decreased from the central portion of the ball movement groove toward both end portions of the ball movement groove with respect to an axis of each of the input and output ramps, and a central radius R1 of each of the ball movement grooves is largest so that a radius of the ball with respect to the axis of each of the input and output ramps is decreased from the central radius R1 to an end radius R3 from the central portion of each of the ball movement grooves toward the end portions of each of the ball movement grooves, and the radius R3 of the end portion of each of the ball movement grooves is an end radius R2 of a circle having a center that is offset from the center by X and Y offset distances.

3. The parking brake as defined in claim 2, wherein the ball movement grooves are formed at three points around the axes of the input and output ramps.

4. The parking brake as defined in claim 3, wherein the ball movement grooves are formed at constant intervals.

5. The parking brake as defined in claim 3, wherein each of the ball movement grooves has a V-shaped cross section.

6. The parking brake as defined in claim 1, wherein the cartridge assembly further includes:
- a spring that generates an elastic force to push the output ramp to an initial position if the output ramp that has moved in the axial direction returns to the initial position while a parking state is released; and
- a holder housing that is provided on the output ramp so as to surround the spring, and is fixed to a spring seat of the input ramp.

7. The parking brake as defined in claim 1, wherein the input ramp includes:
- a rod that has a shape of a long shaft so as to protrude to the outside of the caliper housing;
- a ball movement plate that is formed at an end of the rod received in the liquid pressure chamber of the caliper housing, and has a large diameter and the same axis as the rod; and
- ball movement grooves that are formed on one surface of the ball movement plate at constant intervals, and each have a shape of a channel having a predetermined dimension.

8. The parking brake as defined in claim 1, wherein the output ramp includes:
- a rod that is received in the liquid pressure chamber of the caliper housing, and has a shape of a long shaft so as to push the pad when moving in the axial direction;
- a ball movement plate that is formed at an end of the rod, and has a large diameter and the same axis as the rod; and
- ball movement grooves that are formed on one surface of the ball movement plate at constant intervals, and each have a shape of a channel having a predetermined dimension.

\* \* \* \* \*